(12) United States Patent
Kondapi et al.

(10) Patent No.: US 12,379,943 B2
(45) Date of Patent: Aug. 5, 2025

(54) DYNAMIC DEVICE ENABLEMENT

(71) Applicant: Dell Products L.P., Round Rock, TX (US)

(72) Inventors: Srikanth Kondapi, Austin, TX (US); Danilo O. Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 412 days.

(21) Appl. No.: 17/838,423

(22) Filed: Jun. 13, 2022

(65) Prior Publication Data

US 2023/0401073 A1 Dec. 14, 2023

(51) Int. Cl.
*G06F 9/445* (2018.01)

(52) U.S. Cl.
CPC ...... *G06F 9/44552* (2013.01); *G06F 9/44505* (2013.01); *G06F 9/44526* (2013.01)

(58) Field of Classification Search
CPC .................................................. G06F 9/4411
See application file for complete search history.

(56) References Cited

U.S. PATENT DOCUMENTS

| | | | | |
|---|---|---|---|---|
| 8,848,217 B2* | 9/2014 | Kobayashi | ............ | G06F 3/1225 |
| | | | | 719/321 |
| 11,354,138 B1* | 6/2022 | Tan | ........................ | G06F 9/4411 |
| 2003/0200427 A1* | 10/2003 | Kemp | ................... | G06F 9/4411 |
| | | | | 713/1 |
| 2004/0006766 A1* | 1/2004 | Kim | ....................... | G06F 9/4411 |
| | | | | 717/174 |
| 2004/0187105 A1* | 9/2004 | Inada | ..................... | G06F 9/4411 |
| | | | | 717/122 |
| 2005/0257226 A1* | 11/2005 | Belvin | .................. | G06F 9/4413 |
| | | | | 719/318 |
| 2008/0295074 A1* | 11/2008 | Schneider | ................. | G06F 8/36 |
| | | | | 717/120 |
| 2010/0107097 A1* | 4/2010 | Ferlitsch | ............... | G06F 9/4411 |
| | | | | 715/764 |
| 2010/0318984 A1* | 12/2010 | Araki | .................... | G06F 9/4411 |
| | | | | 358/1.15 |
| 2014/0085674 A1* | 3/2014 | Hasama | ................ | G06F 9/4411 |
| | | | | 358/1.15 |
| 2023/0102514 A1* | 3/2023 | Kirmse | ................... | G06F 16/21 |
| | | | | 707/792 |

* cited by examiner

*Primary Examiner* — Lewis A Bullock, Jr.
*Assistant Examiner* — Carlos Alberto Espana
(74) *Attorney, Agent, or Firm* — Kirton McConkie; Brian Tucker

(57) ABSTRACT

Dynamic device enablement is provided. A device management application can be configured as a shell application and can be customized dynamically with plugins for devices that are connected to a computing device. The plugins can be defined within driver metadata of drivers for the devices. When the drivers are loaded, the device management application can access the driver metadata to dynamically determine which plugins to install and can then automatically install them.

15 Claims, 9 Drawing Sheets

DYNAMIC DEVICE ENABLEMENT

CROSS-REFERENCE TO RELATED APPLICATIONS

N/A

BACKGROUND

Most devices require a driver for proper operation. To allow the user to configure device settings, device management applications may also be provided in addition to the drivers. In some cases, these device management applications may be specific to the devices (e.g., the Dell Touchpad Assistant Application), while in others, the same device management application may support multiple devices (e.g., the Dell Peripheral Manager or the HP Accessory Center).

When a new device is connected, the operating system (e.g., via Windows Update) will typically identify and install the appropriate driver. It is also possible to have the device's corresponding device management application automatically installed. For example, the Windows operating system enables a device management application that is in the form of a Microsoft Store application (e.g., a Win32 app) to be automatically installed when its corresponding device is connected. However, when device management applications are configured to be automatically installed, too many device management applications may be installed which may create discoverability and user experience issues. For example, multiple device management applications that support the same device could be installed.

BRIEF SUMMARY

The present invention extends to systems, methods, and computer program products for dynamic device enablement. A device management application can be configured as a shell application and can be customized dynamically with plugins for devices that are connected to a computing device. The plugins can be defined within driver metadata of drivers for the devices. When the drivers are loaded, the device management application can access the driver metadata to dynamically determine which plugins to install and can then automatically install them.

In some embodiments, the present invention may be implemented as a method for dynamically enabling a device. A device management application can access driver metadata of a first driver for a first device that is connected to a computing device. The device management application can identify one or more plugins defined in the driver metadata of the first driver. The device management application can install the one or more plugins in the device management application to thereby enable the first device to be managed via the device management application.

In some embodiments, the present invention may be implemented as computer storage media storing computer executable instructions which when executed implement a method for dynamically enabling a device. A device management application can be caused to be installed when a first device is connected to a computing device. The device management application can access driver metadata of a first driver for the first device. The device management application can identify one or more plugins defined in the driver metadata of the first driver. The device management application can install the one or more plugins in the device management application to thereby enable the first device to be managed via the device management application.

In some embodiments, the present invention may be implemented as a computing device that includes one or more processors and computer storage media storing computer executable instructions which when executed by the one or more processors implement a method for dynamically enabling a device. When a device management application is loaded on the computing device, the device management application can access driver metadata of a first driver for a first device that is connected to a computing device. The device management application can identify one or more plugins defined in the driver metadata of the first driver. The device management application can install the one or more plugins in the device management application to thereby enable the first device to be managed via the device management application.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "device" should be construed as a peripheral or similar computing component that can be connected to a computing device, whether internally or externally. Examples of devices include a mouse, a keyboard, a touchpad, a speaker, a drive, a webcam, etc. The term "computing device" should be construed as encompassing desktops, laptops, tablets, and the like to which a user may connect a device to use the device with the computing device. The term "store" should be construed as a storage mechanism and could take a variety of forms and may be local, remote, or both local and remote. Although the present invention is described primarily in the context of the Windows operating system, embodiments of the present invention can be implemented in any operating system environment.

Figure 1:
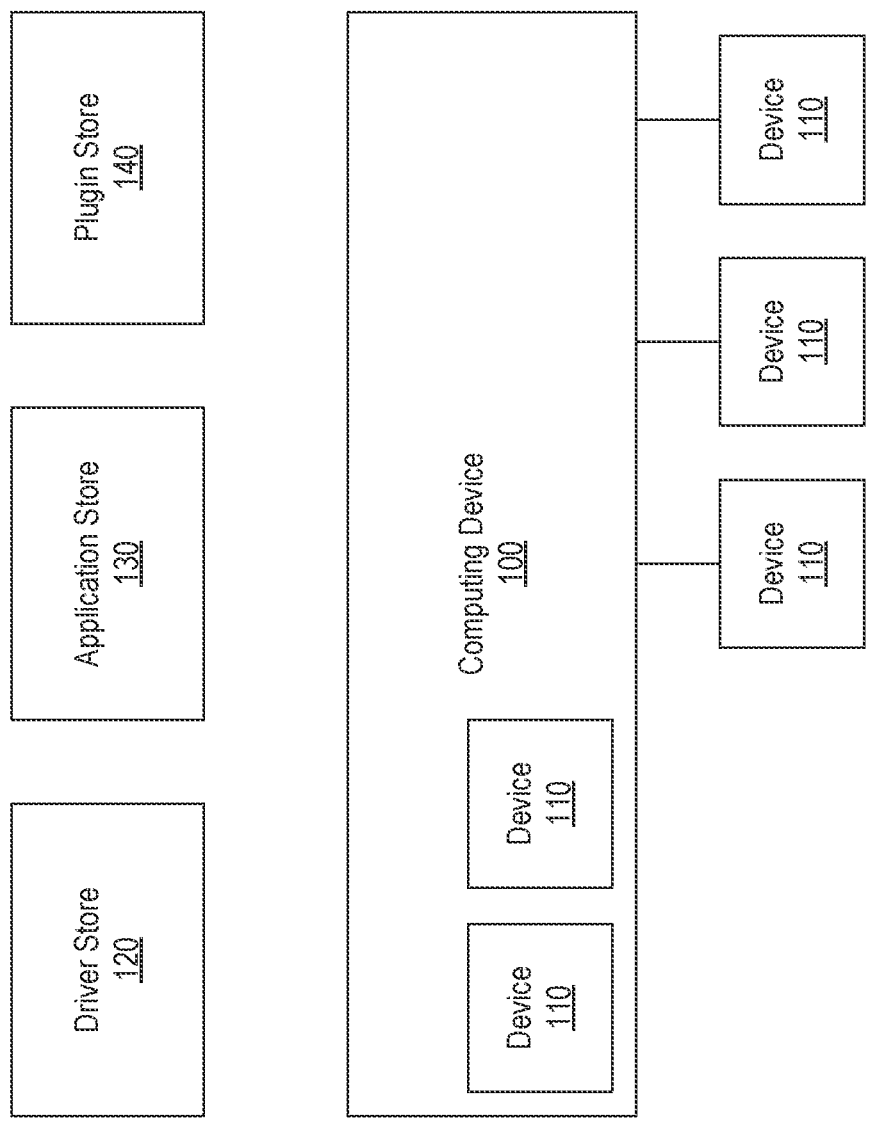
FIG. 1 provides an example of a computing environment in which embodiments of the present invention may be implemented.

FIG. 1 provides an example of a computing environment in which embodiments of the present invention may be implemented. This computing environment includes a computing device 100 that may include or have connected thereto various devices 110, a driver store 120, an application store 130, and a plugin store 140. Although a single computing device 100 is shown, there would typically be many computing devices.

Driver store 120 can represent a storage mechanism where drivers are stored and/or made available for installation on computing device 100. For example, driver store 120 could represent the driver store maintained by the Windows operating system as well as Windows Update. Application store 130 can represent a storage mechanism where applications are stored and/or made available for installation on computing device 100. For example, application store 130 could represent the Microsoft Store. Plugin store 140 can represent a storage mechanism by which plugins are stored and made available for installation in accordance with the techniques of the present invention. As an example only, plugin store 140 could be a cloud-based repository that is managed by Dell for use with devices 110 that may be connected to Dell computing devices 100.

Figure 2:
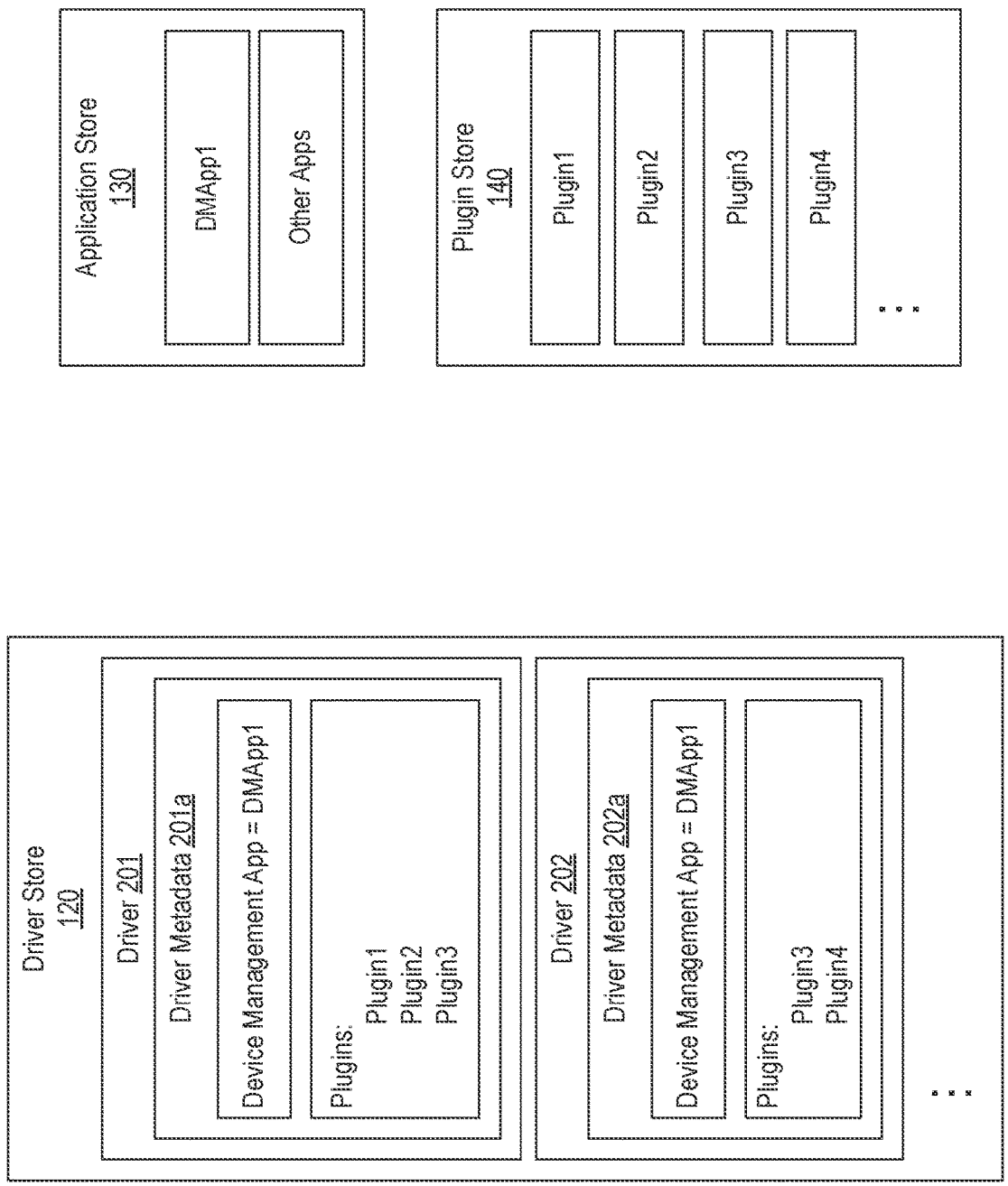
FIG. 2 provides an example of various stores that could be used to implement embodiments of the present invention.

FIG. 2 provides an example of how drivers, applications, and plugins may be stored in driver store 120, application store 130, and plugin store 140 respectively. As shown, a number of drivers can be made available for installation on computing device 100 via driver store 120. At least some of these drivers can be configured in accordance with embodiments of the present invention to allow their respective devices to be dynamically enabled. For example, such drivers can include driver metadata that identifies a device management application by which a user can manage the corresponding device and plugins to the device management application that provide functionality for managing the corresponding device. In FIG. 2, driver store 120 is shown as having a driver 201 with driver metadata 201*a* that identifies "DMAApp1" as the device management application for the device to which driver 201 pertains and identifies plugin1, plugin2, and plugin3 as the plugins to DMAApp1 that provide functionality for enabling the user to manage the device via DMAApp1. In FIG. 2, driver store 120 is also shown as having a driver 202 with driver metadata 202*a* that identifies DMAApp1 as the device management application and plugin3 and plugin4 as the plugins for managing the corresponding device. Accordingly, the devices to which drivers 201 and 202 pertain can be managed via the same device management application but through different sets of plugins. Notably, any number of plugins, including a single plugin, may be used for managing a device.

In Windows-based implementations, at least some of driver metadata 201*a* could be in the form of an INF file. For example, the plugins could be defined/identified within a custom data section in a driver's INF file. In some embodiments, the device management application can be defined within driver metadata 201*a* in a manner that causes the operating system to automatically install the device management application when the corresponding device is connected. For example, the device management application could be identified in the corresponding device's device metadata made available in Windows Metadata and Internet Services.

In FIG. 2, application store 130 is shown as including DMApp1 and other applications. In other words, DMApp1, along with possibly other device management applications and many other applications, can be made available for installation on computing device 100 via application store 130. In FIG. 2, plugin store 140 is shown as including plugin1, plugin2, plugin3, plugin4, and other plugins. However, plugin store 140 need only store plugins that are available for use with a device management application in accordance with embodiments of the present invention.

As an overview, a device management application, such as DMApp1, can be in the form of an application shell that provides common/general functionality. In contrast, a plugin can be configured to provide functionality that is specific to the management of a device. As a result, the device management application is a lean application whose functionality is extended by plugins only as necessary to support the devices that are connected to a computing device. Embodiments of the present invention enable the device management application to be automatically deployed and dynamically updated with only the appropriate plugins.

Figure 3A:
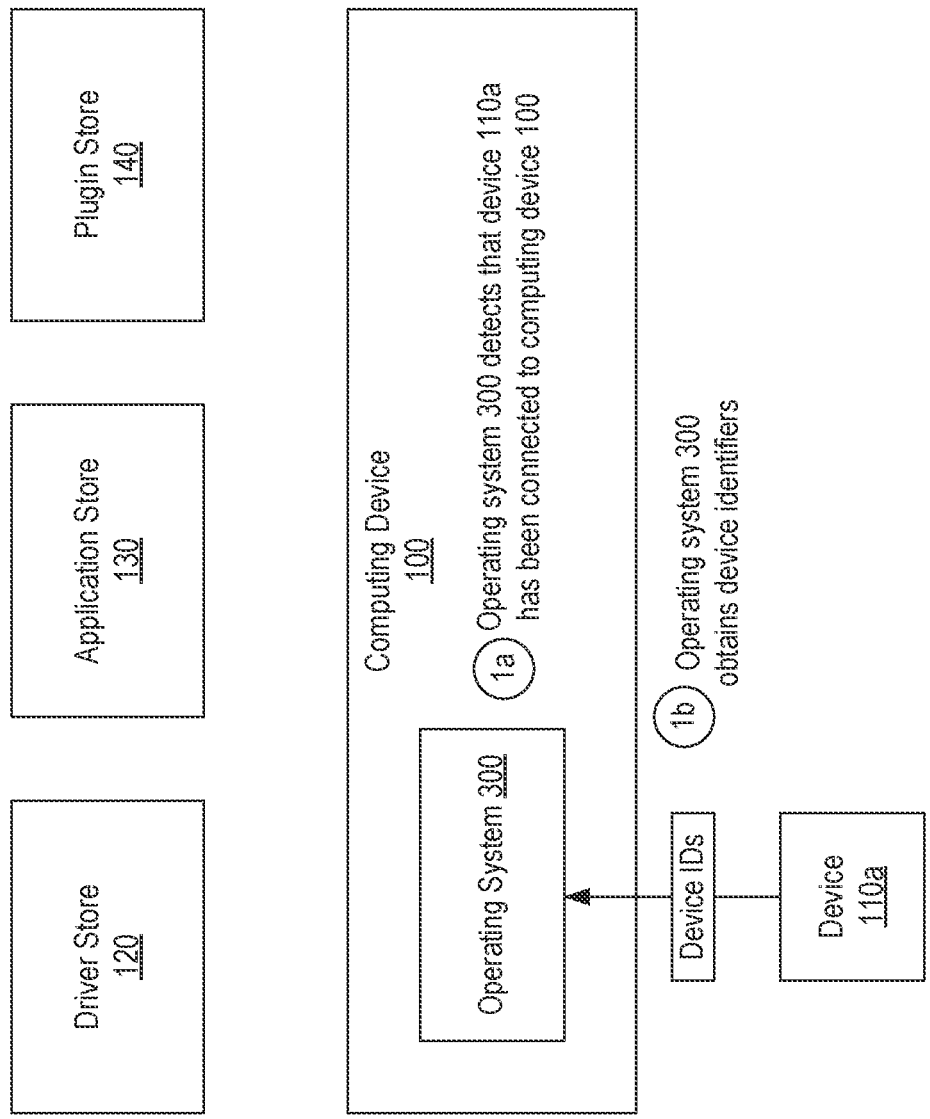
FIGS. 3A-3E provide an example of how a device can be dynamically enabled in accordance with one or more embodiments of the present invention.
Figure 3B:
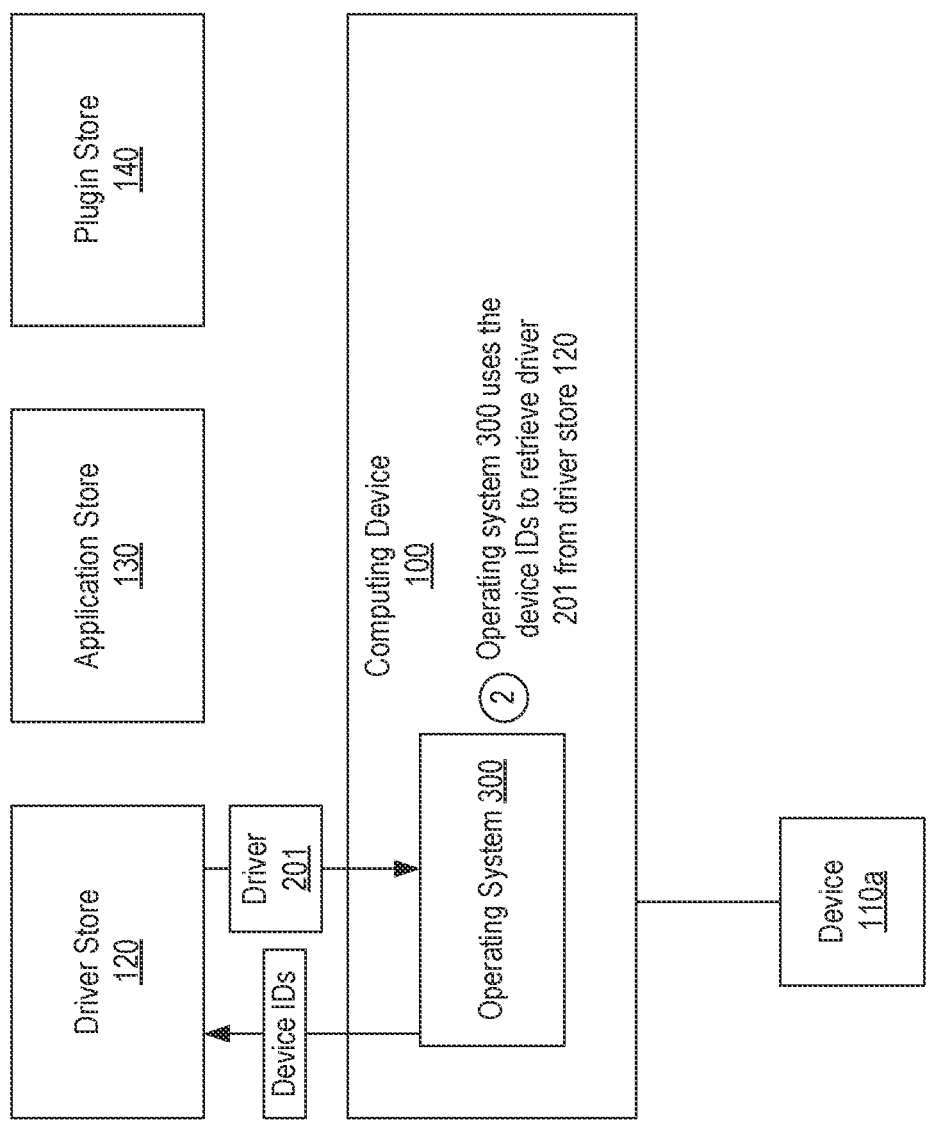

FIGS. 3A-3E, which are based on the computing environment of FIG. 1, provide an example of how a device management application can be dynamically configured with plugins when a device 110 is connected to computing device 100. In FIG. 3A, it is assumed that the user has connected device 110*a* to computing device 100. For example, the user could connect a keyboard while computing device 100 is already on or may boot computing device 100 when the keyboard is already connected. In any case, in step 1*a*, operating system 300 on computing device 100 can detect that device 110*a* has been connected. Then, in step 1*b*, operating system 300 can obtain device identifiers from device 110*a*. Turning to FIG. 3B, in step 2, operating system 300 can use the device identifiers for device 110*a* to access driver store 120 to retrieve the corresponding driver. In this example, it is assumed that driver 201 is the driver that corresponds to device 110*a*. Steps 1*a*, 1*b*, and 2 are intended to represent standard functionality that operating system 300 may perform when a device 110 is connected.

Figure 3C:
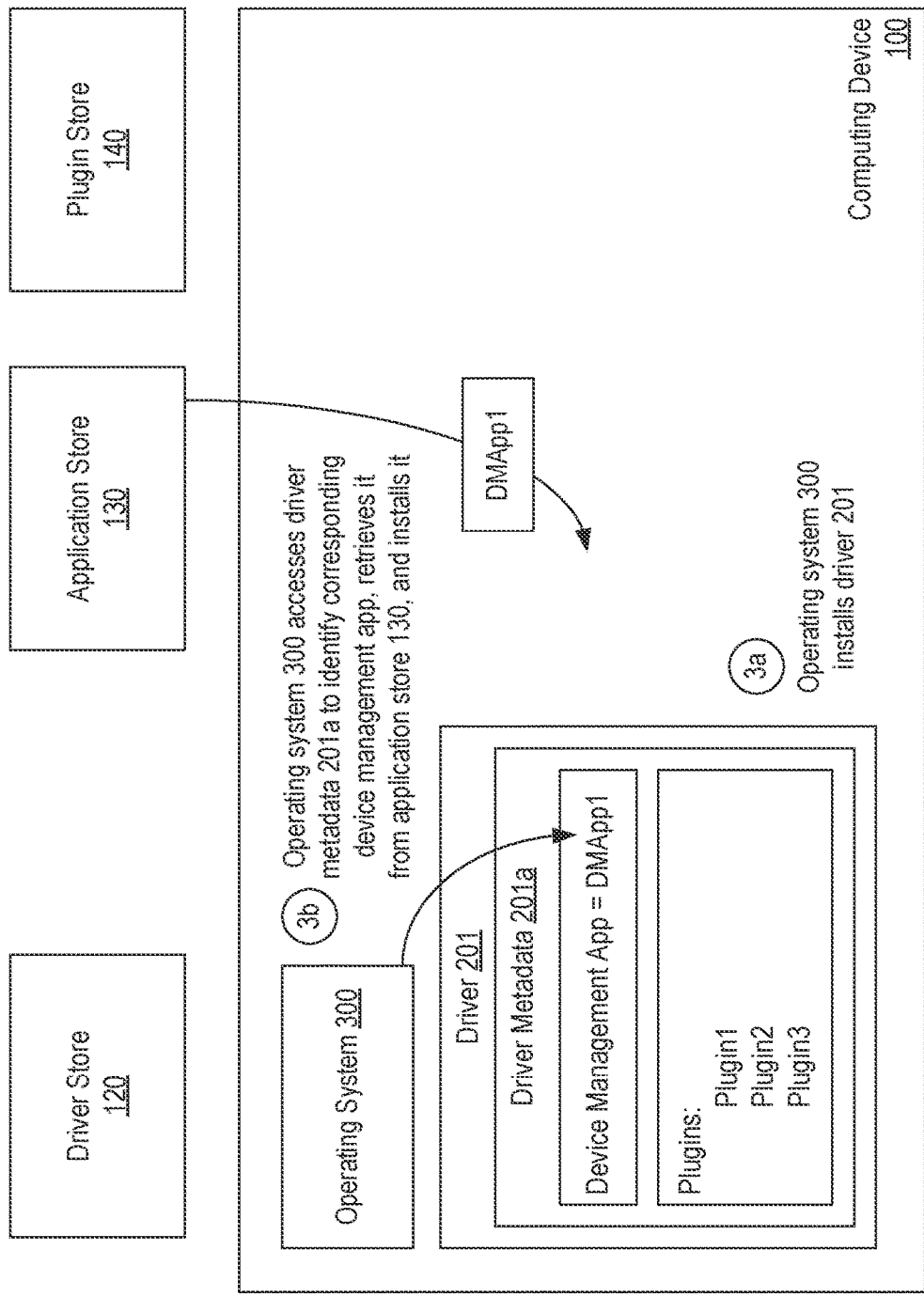

Turning to FIG. 3C, in step 3*a*, operating system 300 installs driver 201 on computing device 100 to thereby cause device 110*a* to be accessible to components on computing device 100. For example, if device 110*a* is a keyboard, the keyboard may be usable after step 3*a*. In step 3*b*, and due to driver metadata 201*a* being configured to identify a device management application, operating system 300 will access driver metadata 201*a* and identify DMApp1 as an application to be installed in response to device 110*a* being connected, access application store 130 to obtain DMApp1, and then install DMApp1 on computing device 100. Notably, if DMApp1 were already installed, step 3*b* could entail launching/notifying DMApp1 that driver 201 has been installed. As described above, DMApp1 can be a shell application that does not provide functionality for managing device 110*a* but only provides general functionality (e.g., user interface functionality and functionality for identifying and installing plugins for connected devices).

Figure 3D:
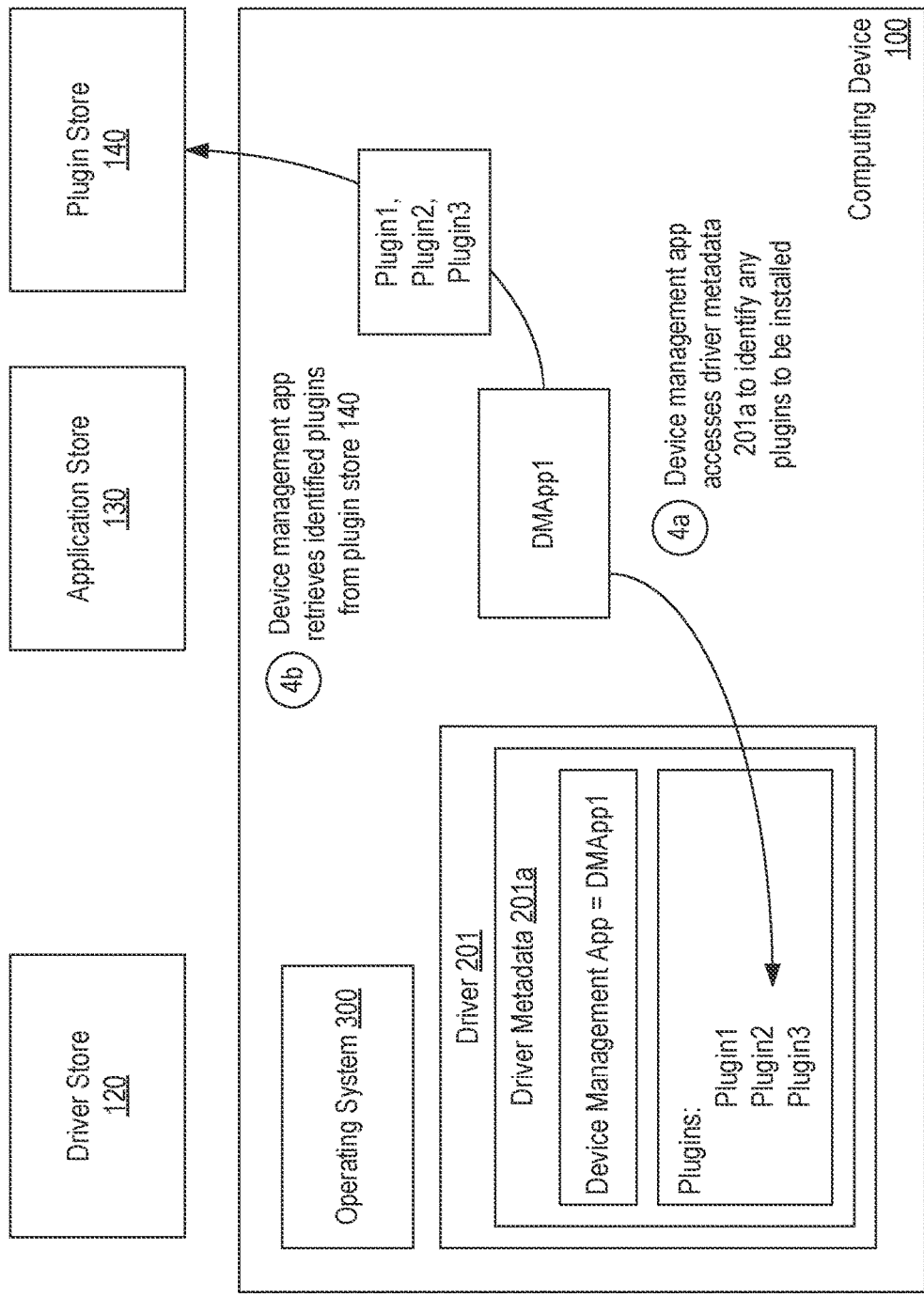

Turning to FIG. 3D, in step 4*a* and with DMApp1 installed on computing device 100, it can access driver metadata 201*a* to identify plugins to be installed for managing device 110*a*. In some embodiments, DMApp1 could identify each connected device and then locate the respective drivers to perform step 4*a*. In step 4*b*, DMApp1 can access plugin store 140 to retrieve each plugin identified in driver metadata 201*a*. Although not shown, in some embodiments, driver metadata 201*a* could include a URL or other location identifier at which the identified plugins could be retrieved from plugin store 140 (e.g., https://downloads.dell.com/downloads).

Figure 3E:
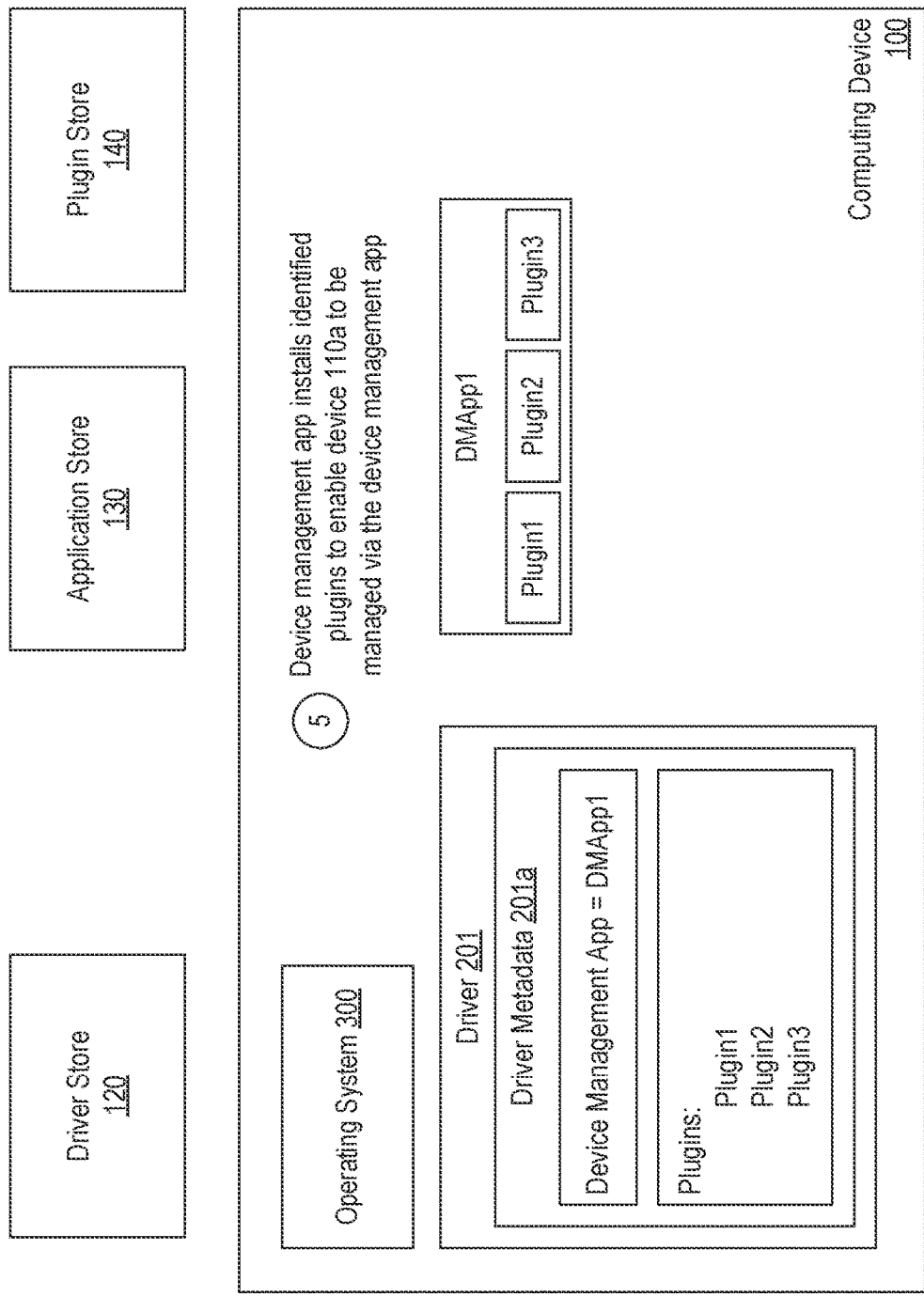

Turning to FIG. 3E, in step 5, DMApp1 can install the plugins identified in driver metadata 201*a* to thereby enable device 110*a* to be managed via DMApp1. In other words, device 110*a* is dynamically enabled by installing plugin1, plugin2, and plugin3 in DMApp1 only in response to device 110*a* being connected to computing device 100. In this way, DMApp1 can retain a minimal footprint while being capable of supporting the management of a variety of devices that the user could connect to computing device 100. After step 5, the user will be able to manage device 110*a* via DMApp1.

For example, if device 110a is a touchpad, plugin1, plugin2, and/or plugin3 could include functionality for enabling the user to control the pointer speed and for defining the button functions and gestures.

Figure 4A:
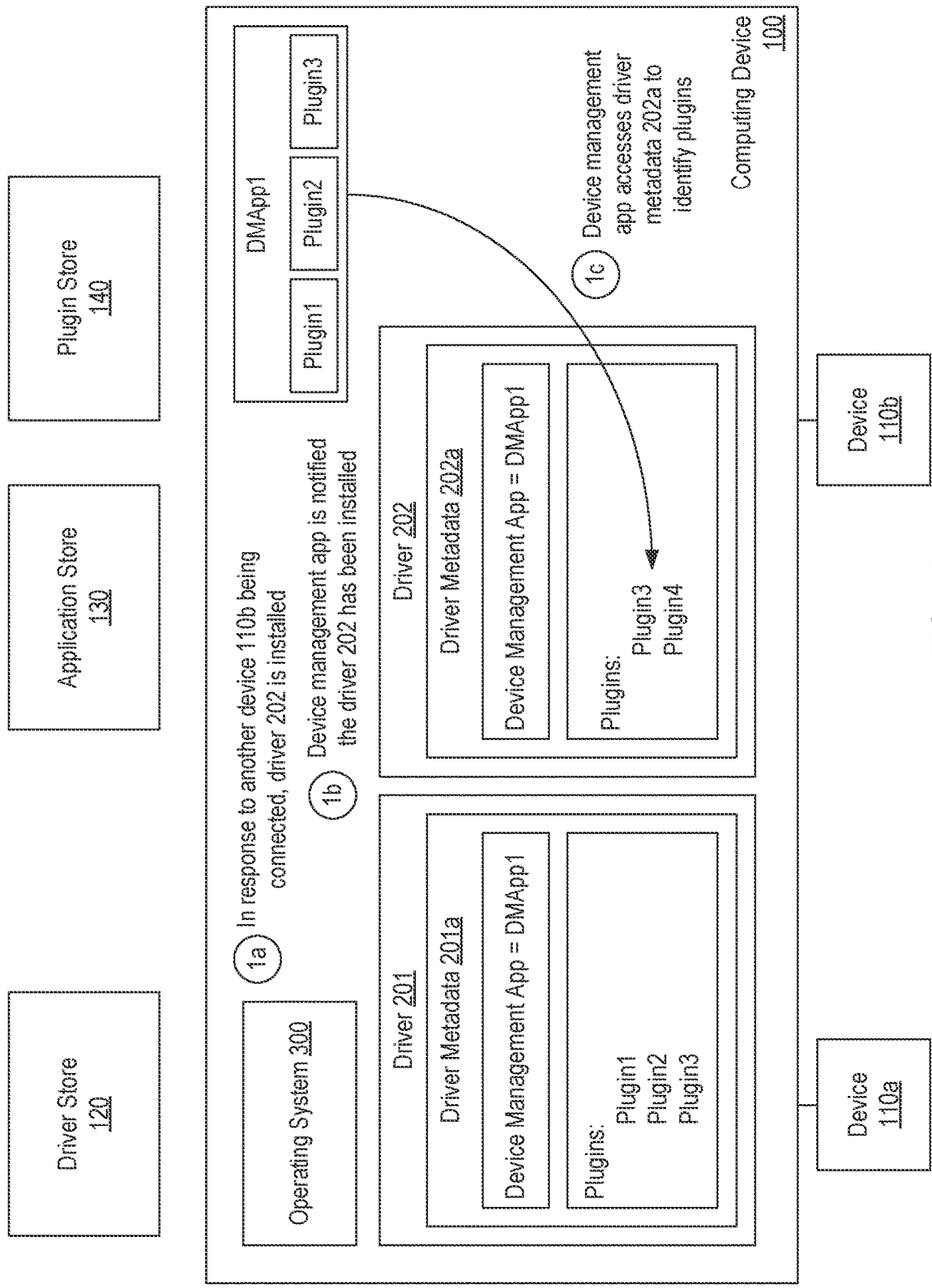
FIGS. 4A and 4B provide an example of how another device can be dynamically enabled in accordance with one or more embodiments of the present invention.
Figure 4B:
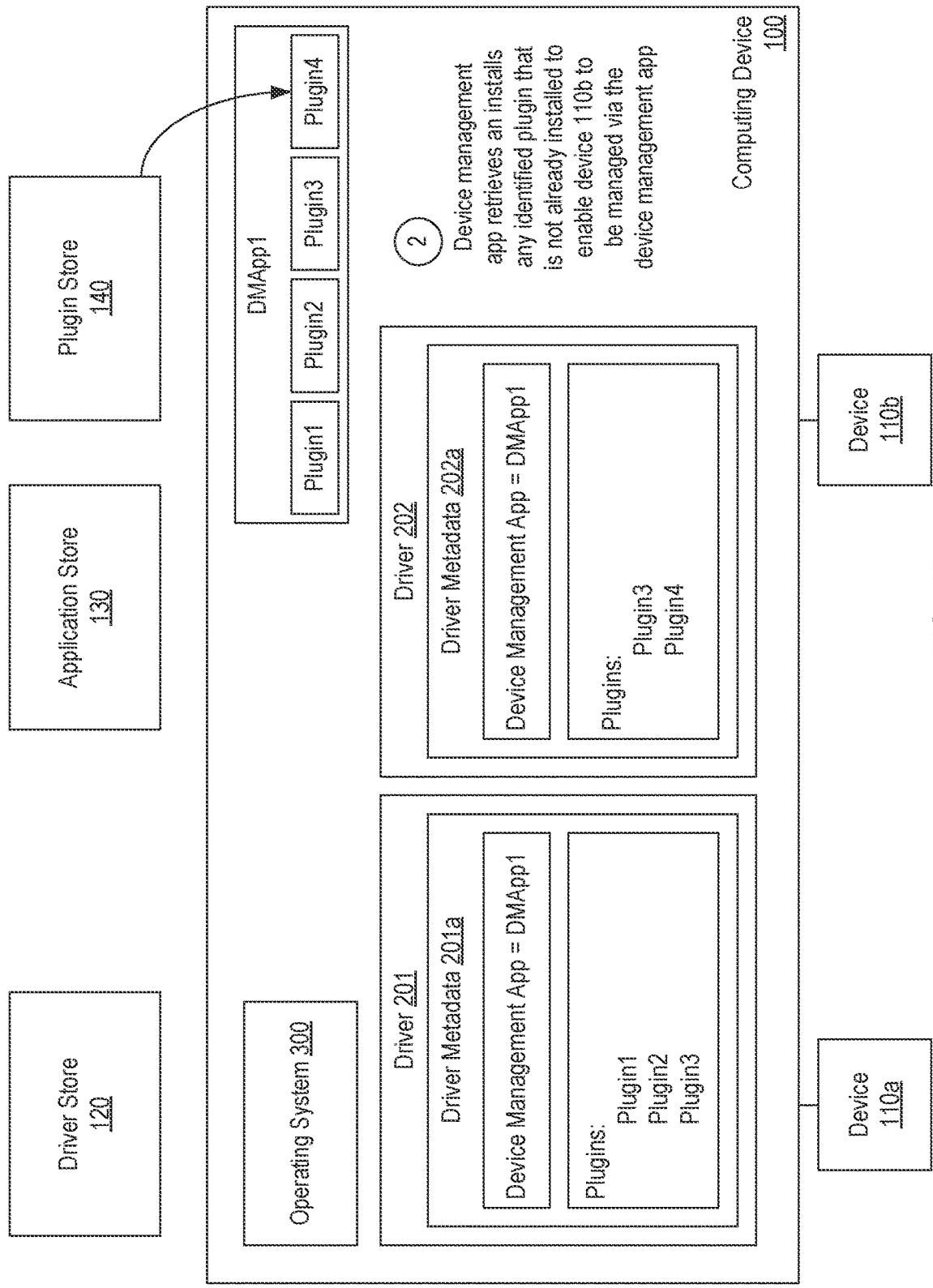

FIGS. 4A and 4B, which continue the example of FIGS. 3A-3E, represent functionality that can be performed when another device 110b is connected to computing device 100. In step 1a, driver 202 is installed in response to device 110b being connected. Step 1a of FIG. 4A can be generally the same as steps 1a-3a in Figured 3A-3C. In step 1b and based on driver metadata 202a identifying DMApp1 as the device management application for device 110b, operating system 300 may notify/invoke DMApp1. Because of the previously described functionality, DMApp1 already includes plugin1, plugin2, and plugin3 for enabling management of device 110a. In step 1c, DMApp1 can access driver metadata 202a to determine which plugins should be installed to enable management od device 110b via DMApp1. In this case, DMApp1 will determine that plugin3 and plugin4 are required for device 110b.

Turning to FIG. 4B, in step 2, DMApp1 can retrieve and install any plugin identified in driver metadata 202a that is not already installed. In this example, DMApp1 will determine that plugin3 is already installed and can therefore retrieve and install plugin 4 to thereby enable devices 110a and 110b to be managed via DMApp1. Notably, there may be cases where plugins provide overlapping functionality. In such cases, DMApp1 could determine which plugin should be installed while installing another overlapping plugin. For example, if a currently installed plugin enables management of a subset of functionality that is provided by a new plugin identified in driver metadata for a newly connected device, DMApp1 could uninstall the currently installed plugin and install the new plugin.

In some embodiments, a device management application may also be configured to uninstall another device management application. For example, two device management applications may provide overlapping functionality such as when one device management application is specific to a single device 110 and another device management application can be used to manage a variety of devices. In such a case, if the user connects a device 110 having device metadata that defines a first device management application that can manage multiple devices and a second device management application that is specific to one of the multiple devices is already installed, the first device management application (e.g., as part of its installation or the installation of plugins) can uninstall the second device management application so that two device management applications providing the same functionality are not concurrently installed.

In some embodiments, driver metadata may be used to identify a manifest and the device management agent may use the manifest to identify and retrieve the plugins. For example, a manifest may include a manifest identifier and may define the plugins for a particular device 110. The driver metadata may then include the manifest identifier by which the device management application identified in the driver metadata can obtain the manifest and then identify and retrieve the plugins.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for dynamically enabling a device, the method comprising:
   in response to a first device being connected to a computing device, detecting, by a device management application, that an operating system on the computing device has installed a first driver for the first device, wherein the device management application is provided in an application store on the computing device and is installed or invoked by the operating system in response to the first device being connected to the computing device as a result of the device management application being identified in driver metadata of the first driver for the first device;
   accessing, by the device management application, the driver metadata of the first driver;

identifying, by the device management application, one or more plugins defined in the driver metadata of the first driver, the one or more plugins being available in a plugin store on the computing device, the one or more plugins including a first plugin;

obtaining, by the device management application, the one or more plugins from the plugin store;

installing, by the device management application, the one or more plugins in the device management application to thereby dynamically enable the first device to be managed via the device management application;

accessing, by the device management application, driver metadata of a second driver for a second device that is connected to the computing device;

identifying, by the device management application, one or more additional plugins defined in the driver metadata of the second driver;

installing, by the device management application, the one or more additional plugins in the device management application to thereby dynamically enable the second device to be managed via the device management application; and uninstalling the first plugin in conjunction with installing the one or more additional plugins.

2. The method of claim 1, wherein the device management application is installed in response to the first device being connected to the computing device.

3. The method of claim 1, wherein the driver metadata of the first driver is defined in an INF file.

4. The method of claim 1, wherein the one or more plugins provide functionality for changing one or more settings of the first device.

5. The method of claim 1, wherein the first plugin is uninstalled in response to determining that the first plugin and the one or more additional plugins provide overlapping functionality.

6. The method of claim 1, further comprising:
determining that the one or more plugins provide overlapping functionality with an existing device management application; and
uninstalling the existing device management application in conjunction with installing the one or more plugins in the device management application.

7. One or more computer storage media storing computer executable instructions which when executed implement a method for dynamically enabling a device, the method comprising:

in response to a first device being connected to a computing device, detecting, by a device management application, that an operating system on the computing device has installed a first driver for the first device, wherein the device management application is provided in an application store on the computing device and is installed or invoked by the operating system in response to the first device being connected to the computing device as a result of the device management application being identified in driver metadata of the first driver for the first device;

accessing, by the device management application, the driver metadata of the first driver;

identifying, by the device management application, one or more plugins defined in the driver metadata of the first driver, the one or more plugins being available in a plugin store on the computing device, the one or more plugins including a first plugin;

obtaining, by the device management application, the one or more plugins from the plugin store; and installing, by the device management application, the one or more plugins in the device management application to thereby dynamically enable the first device to be managed via the device management application;

accessing, by the device management application, driver metadata of a second driver for a second device that is connected to the computing device;

identifying, by the device management application, one or more additional plugins defined in the driver metadata of the second driver;

installing, by the device management application, the one or more additional plugins in the device management application to thereby dynamically enable the second device to be managed via the device management application; and uninstalling the first plugin in conjunction with installing the one or more additional plugins.

8. The computer storage media of claim 7, wherein the device management application is installed in response to the first device being connected to the computing device.

9. The computer storage media of claim 7, wherein the driver metadata of the first driver is defined in an INF file.

10. The computer storage media of claim 7, wherein the one or more plugins provide functionality for changing one or more settings of the first device.

11. The computer storage media of claim 7, wherein the first plugin is uninstalled in response to determining that the first plugin and the one or more additional plugins provide overlapping functionality.

12. The computer storage media of claim 7, wherein the method further comprises:
determining that the one or more plugins provide overlapping functionality with an existing device management application; and
uninstalling the existing device management application in conjunction with installing the one or more plugins in the device management application.

13. A computing device comprising:
one or more processors; and
computer storage media storing computer executable instructions which when executed by the one or more processors implement a method for dynamically enabling a device, the method comprising:
in response to a first device being connected to the computing device, detecting, by a device management application, that an operating system on the computing device has installed a first driver for the first device, wherein the device management application is provided in an application store on the computing device and is installed or invoked by the operating system in response to the first device being connected to the computing device as a result of the device management application being identified in driver metadata of the first driver for the first device;

accessing, by the device management application, driver metadata of the first driver;

identifying, by the device management application, one or more plugins defined in the driver metadata of the first driver, the one or more plugins being available in a plugin store on the computing device, the one or more plugins including a first plugin;

obtaining, by the device management application, the one or more plugins from the plugin store;

installing, by the device management application, the one or more plugins in the device management application to thereby dynamically enable the first device to be managed via the device management application;

accessing, by the device management application, driver metadata of a second driver for a second device that is connected to the computing device;

identifying, by the device management application, one or more additional plugins defined in the driver metadata of the second driver;

installing, by the device management application, the one or more additional plugins in the device management application to thereby dynamically enable the second device to be managed via the device management application; and uninstalling the first plugin in conjunction with installing the one or more additional plugins.

14. The computing device of claim 13, wherein the method further comprises:

accessing, by the device management application, driver metadata of a second driver for a second device that is connected to the computing device;

identifying, by the device management application, one or more additional plugins defined in the driver metadata of the second driver; and installing, by the device management application, the one or more additional plugins in the device management application to thereby dynamically enable the second device to be managed via the device management application.

15. The computing device of claim 13, wherein the one or more plugins include a first plugin, the method further comprising:

accessing, by the device management application, driver metadata of a second driver for a second device that is connected to the computing device;

identifying, by the device management application, one or more additional plugins and the first plugin defined in the driver metadata of the second driver; and installing, by the device management application, the one or more additional plugins but not the first plugin in the device management application to thereby dynamically enable the second device to be managed via the device management application.

* * * * *